(12) United States Patent
Otte et al.

(10) Patent No.: US 9,166,694 B2
(45) Date of Patent: Oct. 20, 2015

(54) OPTICAL COUPLING UNIT FOR AN ARRANGEMENT FOR SENDING OPTICAL SIGNALS, AN ARRANGEMENT FOR SENDING OPTICAL SIGNALS AND AN OPTICAL TRANSCEIVER

(75) Inventors: Sven Otte, Hohen Neuendorf (DE); Kai Schamuhn, Berlin (DE); Andreas Krink, Berlin (DE); Juergen Blank, Berlin (DE); Nicola Iwanowski, Berlin (DE)

(73) Assignee: FCI, Guyancourt (FR)

( * ) Notice: Subject to any disclaimer, the term of this patent is extended or adjusted under 35 U.S.C. 154(b) by 132 days.

(21) Appl. No.: 13/996,581

(22) PCT Filed: Dec. 20, 2011

(86) PCT No.: PCT/IB2011/003289
§ 371 (c)(1),
(2), (4) Date: Sep. 23, 2013

(87) PCT Pub. No.: WO2012/085678
PCT Pub. Date: Jun. 28, 2012

(65) Prior Publication Data
US 2014/0029953 A1    Jan. 30, 2014

(30) Foreign Application Priority Data
Dec. 21, 2010   (DE) .................. 10 2010 061 452

(51) Int. Cl.
*G02B 6/42* (2006.01)
*H04B 10/50* (2013.01)
*G02B 27/14* (2006.01)

(52) U.S. Cl.
CPC ............ *H04B 10/501* (2013.01); *G02B 6/4206* (2013.01); *G02B 6/4214* (2013.01); *G02B 6/4246* (2013.01); *G02B 27/144* (2013.01)

(58) Field of Classification Search
CPC ........ G02B 6/00; G02B 27/00; G02B 6/4206; G02B 6/4214; G02B 6/4246; H04B 10/40; H04B 10/501
USPC .............. 385/16, 37, 38, 39, 47, 50; 398/139, 398/200, 201
See application file for complete search history.

(56) References Cited

U.S. PATENT DOCUMENTS

| 5,898,803 A | 4/1999 | Mueller-Fiedler et al. ..... 385/36 |
| 2004/0067025 A1 | 4/2004 | Haraguchi et al. ............. 385/49 |

(Continued)

FOREIGN PATENT DOCUMENTS

| CN | 1643422 A | 7/2005 |
| CN | 1653369 A | 8/2005 |

(Continued)

*Primary Examiner* — Akm Enayet Ullah
(74) *Attorney, Agent, or Firm* — Harrington & Smith

(57) ABSTRACT

The invention relates to an optical coupling unit for an arrangement for sending optical signals, including a base unit, a light path formed between a light input and a light output of the base unit and configured to transmit light received via the light input to the light output, an outer light path section included in the light path, which section extends outside the base unit and into which the light transmitted along the light path emerges from the base unit via a light exit and from which the light after passing through the outer light path section enters again into the base unit via a light entry, and a light decoupling element, which is formed in the light path by means of at least one beamsplitting surface coating and configured to decouple a portion of the light transmitted along the light path. Furthermore the invention relates to an arrangement for sending optical signals and to an optical transceiver.

13 Claims, 2 Drawing Sheets

(56) References Cited

U.S. PATENT DOCUMENTS

Figure 1:
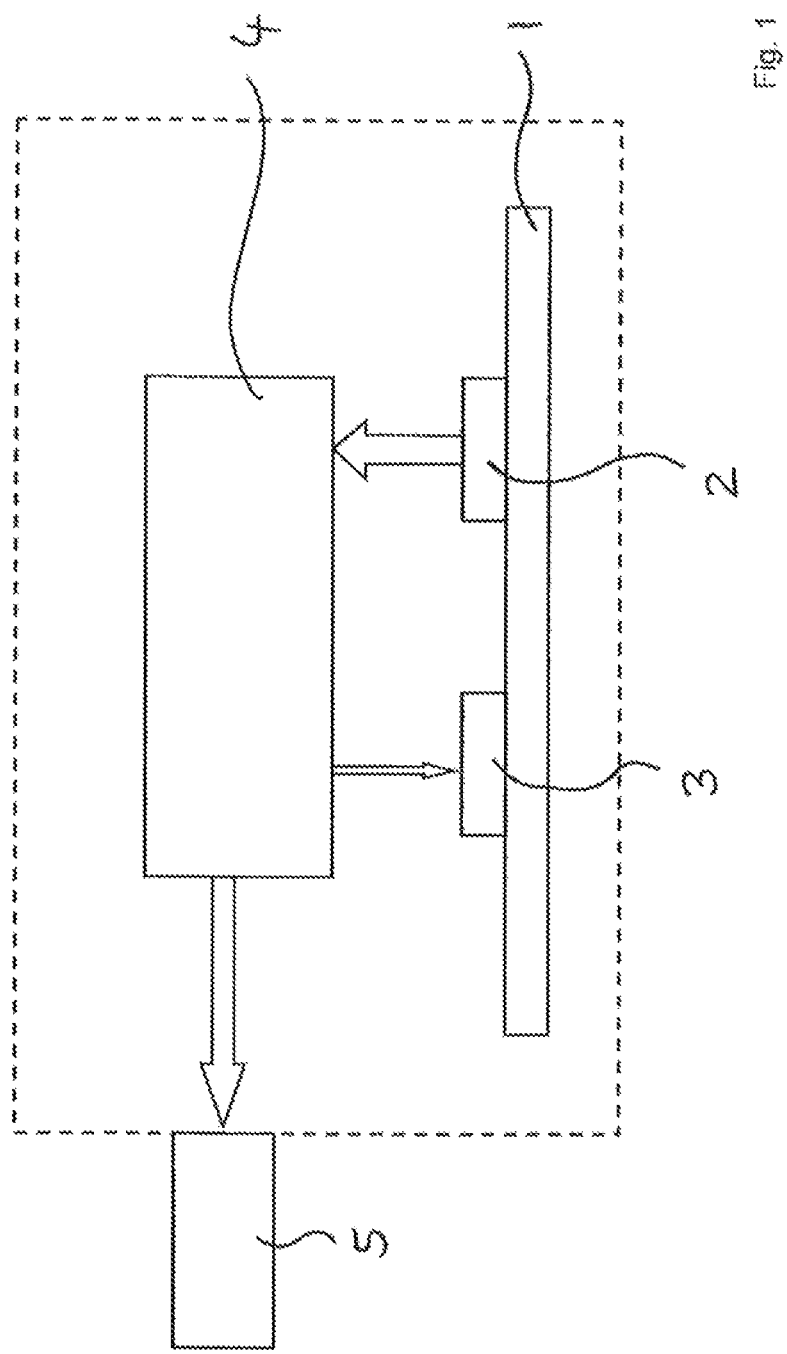

| | | | |
|---|---|---|---|
| 2004/0174523 A1* | 9/2004 | Uhl et al. | 356/318 |
| 2004/0179784 A1 | 9/2004 | Vancoille et al. | 385/47 |
| 2004/0240014 A1* | 12/2004 | Shih | 359/35 |
| 2009/0016733 A1 | 1/2009 | Hamazaki et al. | 398/139 |
| 2009/0154155 A1* | 6/2009 | Grotsch | 362/231 |
| 2011/0174986 A1* | 7/2011 | Kempe et al. | 250/458.1 |
| 2012/0263416 A1 | 10/2012 | Morioka | 385/33 |
| 2013/0094077 A1* | 4/2013 | Brueck et al. | 359/385 |
| 2014/0340669 A1* | 11/2014 | Dobschal et al. | 356/4.01 |

FOREIGN PATENT DOCUMENTS

| | | |
|---|---|---|
| CN | 1761900 A | 4/2006 |
| EP | 0 803 757 A1 | 10/1997 |
| EP | 1 469 331 A1 | 10/2004 |
| EP | 2 189 829 A1 | 5/2010 |
| WO | WO-2004/083926 A1 | 9/2004 |
| WO | WO2011/077723 A1 | 6/2011 |

* cited by examiner

OPTICAL COUPLING UNIT FOR AN ARRANGEMENT FOR SENDING OPTICAL SIGNALS, AN ARRANGEMENT FOR SENDING OPTICAL SIGNALS AND AN OPTICAL TRANSCEIVER

The invention relates to an optical coupling unit for an arrangement for sending optical signals, an arrangement for sending optical signals as well as an optical transceiver.

BACKGROUND OF THE INVENTION

Transmitter arrangements are utilised to generate optical signals by means of a transmitter and to couple the optical signals provided in the form of light signals into an optical waveguide, in particular into an optical fibre. Transmitting light from the transmitter to the optical fibre connection may be effected using an optical coupling unit, for example, which guides the light emitted by the transmitter. To this end the optical coupling unit normally comprises optical elements such as in the form of optical lenses.

The document US 2009/0016733 A1 discloses an optical transceiver, where the optical coupling unit is arranged on a circuit board. The optical coupling unit is used by several channels to transmit light signals between optical fibres and photo-electric elements. The photo-electric elements are designed to receive light signals and convert them into electrical signals. In addition they may also be configured to convert received electrical signals into light signals in order to then guide the generated light to optical fibres via an optical coupling unit. Such arrangements which can convert both light signals into electrical signals (receiver) and electrical signals into light signals (transmitter) are also referred to as transceivers.

In conjunction with arrangements for sending optical signals it is also known to transfer part of the light generated by the transmitter to a monitor diode, which makes it possible to monitor the transmitter's light signal emissions. If required control signals may be derived from the signals at the monitor diode, which are fed back to the transmitter control in order, for example, to achieve an essentially constant intensity of the emitted light signals.

SUMMARY OF THE INVENTION

It is an object of the invention to provide an optical coupling unit for an arrangement for sending optical signals, an arrangement for sending optical signals as well as an optical transceiver with enhanced operating functionality. In particular the optical coupling is to be improved along with a compact construction.

According to the invention an optical coupling unit for an arrangement for sending optical signals according to independent claim 1, an arrangement for sending optical signals according to independent claim 9 as well as an optical transceiver according to independent claim 10 are provided. Advantageous developments of the invention are the subject of dependent sub-claims.

The invention comprises the idea of an optical coupling unit for an arrangement for sending optical signals comprising: a base unit, a light path formed between a light input and a light output of the base unit and configured to transmit light received via the light input to the light output, an outer light path section included in the light path, which extends outside the base unit and into which the light transmitted along the light path exits from the base unit via a light exit and from which the light after passing through the outer light path section enters into the base unit via a light entry, and a light-decoupling unit which is formed in the light path by means of at least one beam-splitting surface coating and configured to decouple part of the light transmitted along the light path.

Furthermore an arrangement for sending optical signals and an optical transceiver comprising such a coupling unit are provided.

One advantage of the invention consists in that the optical coupling unit can be constructed in a compact manner and in that the light-decoupling element preferably acting as a beam splitter decouples part of the light in a simple and efficient manner, for example for a monitoring device without needlessly interfering with the guiding of the light.

Preferably the base unit is manufactured completely from a light-transparent material. The light path, as regards the part of the path within the base unit, extends completely within the light-transparent material. The base unit may be manufactured as a solid material block, for example by means of injection moulding. In a preferred embodiment the base unit is manufactured from a light-transparent plastic material. The entire base unit may be manufactured as a casting. The plastic material used may for example be a polyetherimide.

In the area of the light exit and/or the light entry optical elements may be arranged on the base unit, for example optical elements acting as lenses. Preferably the optical elements are integrated with the base unit.

One embodiment provides for the light-decoupling element also referred to as light decoupler or beam splitter to be formed in the area of the outer light path section, in particular in the border area where the light passes from the base unit into the outer light path section.

One advantageous embodiment of the invention provides for the outer light path section to extend at least partially through an additional unit of a light-transparent material. Provision may be made for the outer light path to be formed such that it essentially completely extends within the light-transparent material of the additional unit which may also referred to as supplementary unit. The additional or supplementary unit may be shaped as an insert element which is received in an associated recess on the base unit. For example, it may be shaped as a casting made from a plastic material. The plastic material may, for example, be a polyetherimide. Alternatively the additional unit may be manufactured from a grouting inserted into the associated recess on the base unit.

Preferably a further embodiment of the invention provides for the light-transparent material of the additional unit to be a material which has essentially the same optical refractive index as a light-transparent base unit material, i.e. a material within which extend the sections of the light path formed within the base unit. The additional unit is then formed of an index-adapted material. In one embodiment the light-transparent material of the additional unit is the same material as that of the base unit, for example a light-transparent plastic material.

An advantageous embodiment of the invention may provide for the additional unit, at least in partial areas of its surface, to positively lock with associated surfaces of the base unit. This positive locking which may also referred to as form fitting may be provided, in particular, at least in the area of the light exit and/or at least in the area of the light entry.

A further embodiment of the invention may provide for associated surfaces of the base unit and the additional unit to be arranged lying on top of each other, at least in the area of the light exit and/or in the area of the light entry. This lying on top of each other of associated surface portions may, for example, be effected by means of an adhesive. With this or other embodiments of the invention there is no air gap at least in the area of the light exit and/or at least in the area of the light entry so that the light to be transmitted is not guided through an air gap at the transition from the base unit into the outer light path section and/or at the transition from the outer lighter path section back into the base unit. The distance between associated surfaces of the base unit and the additional unit in the area of the light exit and/or in the area of the light entry is preferably less than 10 μm. The gap determining the distance is preferably free from air, i.e. is filled by an adhesive, for example.

A preferred further embodiment of the invention envisages that the at least one light-decoupling surface coating of the light-decoupling element is formed on an outer surface portion of the base unit. The decoupling surface coating causes the beams to be split thereby realising a beam splitter in that the light is partially allowed through and partially reflected back. Thus a partially reflecting coating is formed on the outer surface portion of the base unit. Such a coating may be manufactured for example by means of vacuum separation of a suitable material. Materials for such coatings are known as such in various embodiments. For example identical or similar coatings are used on beam splitters shaped in the form of prisms or semi-transparent mirrors.

A convenient embodiment of the invention may provide for another beam-splitting surface coating of the light-decoupling element to be formed on an outer surface portion of the additional unit. The explanations given earlier in connection with the beam-splitting surface coating apply analogously in conjunction with the other beam-splitting surface coating. The other beam-splitting surface coating of the light-decoupling element on the outer surface portion of the additional unit may be provided as an alternative or in addition to the coating on the base unit.

An advantageous embodiment of the invention provides for the at least one beam-splitting surface coating and/or the other beam-splitting surface coating to be formed in the area of the light exit or the light entry. With this embodiment beam-splitting takes place at the transition of the light from the base unit into the outer light path and/or at the transition of the light from the outer light path into the base unit. The principle of partial reflection is utilised for example.

DESCRIPTION OF PREFERRED
EMBODIMENTS OF THE INVENTION

Figure 2:
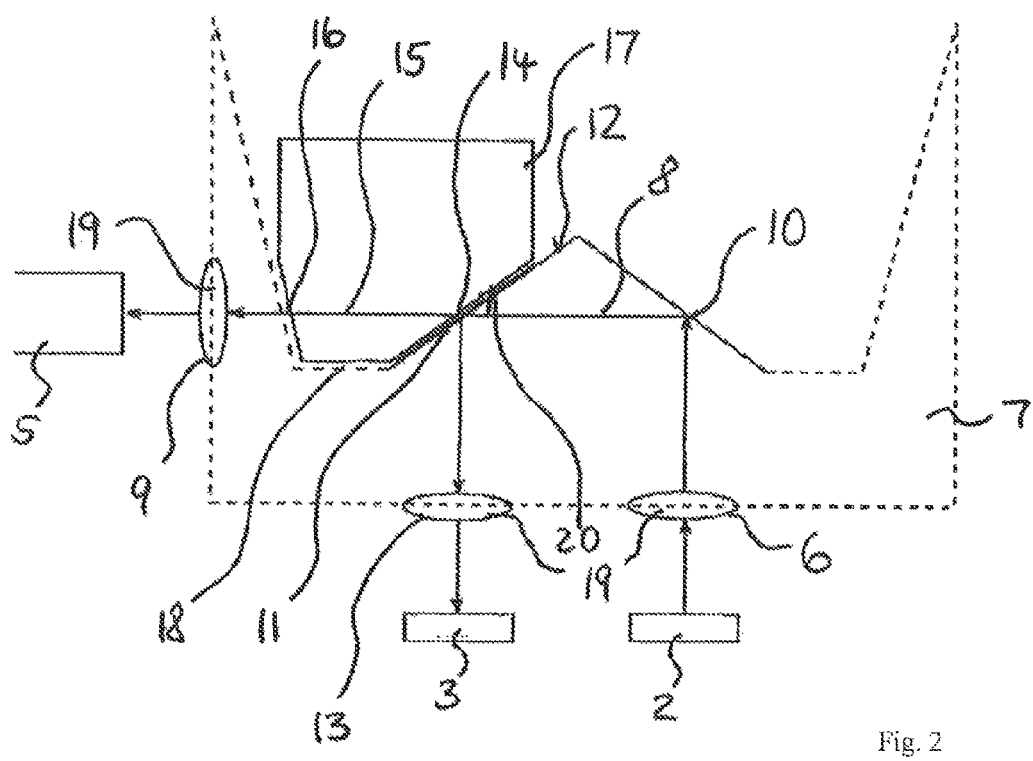

The invention will now be discussed in detail by way of preferred embodiments with reference to the figures of a drawing, in which:

FIG. 1 shows a schematic illustration of an arrangement for sending optical signals and FIG. 2 shows a schematic detail illustration for the arrangement in FIG. 1.

FIG. 1 shows a schematic illustration of an arrangement for generating and sending optical signals. A carrier 1 realised as a circuit board carries a transmitter 2 and a monitoring device 3. Light signals are emitted by the transmitter 2 which for example is formed by means of a laser diode. The emitted light is then guided to an optical fibre connection 5 using an optical coupling unit 4.

The arrangement is preferably received in a housing which is shown in FIG. 1 by means of dashed lines. In the case of an optical transceiver the carrier may additionally hold a receiver, for example a photo-diode, which converts light signals received via an optical fibre into electrical signals. Guiding of the received light may also be effected optionally via the optical coupling unit 4.

The optical coupling unit 4 may be used to realise a multi-channel light guide.

FIG. 2 shows a schematic detail illustration for the arrangement in FIG. 1. The light emitted by transmitter 2 arrives at the base unit 7 of the optical coupling unit 4 via a light input 6 associated with transmitter 2. Starting from light input 6 the light in base unit 7 is guided along a light path 8 to a light output 9 of the base unit 7 associated with the optical fibre connection 5. Along light path 8 the light is diverted at a mirror surface 10 and then arrives, in the material of the base unit 7, at a light-decoupling element 11 implementing a beam splitter which is formed using an outer coating on an outer surface 12 of the base unit 7. With the help of the light-decoupling element 11 part of the light is decoupled by means of reflection and decoupled from the base unit 7 via a monitor light output 13 associated with monitoring device 3.

Downstream of the light-decoupling element 11 the light enters via a light exit 14 into an outer light path section 15, at the end of which it enters again, via a light entry 16, into the base unit 7, and finally arrives at the light output 9.

According to the illustration in FIG. 2 the outer light path section 15 essentially completely extends within the light-transparent material of an additional or insert element 17, which in the embodiment shown in FIG. 2 is inserted and glued into an associated recess 18 on the base unit 7 so as to be at least partially positively locking.

The dashed lines on the base unit 7 in FIG. 2 show that the base unit 7 may have different shapes which can be adapted, as required, to suit different applications.

The light input 6, the monitor light output 134 as well as the light output 9 are formed respectively by an optical element 19, i.e. a lens which in the embodiment shown is integrated with the base unit 7 in that a respective curved outer surface is formed on the base unit 7.

In another embodiment the light-decoupling element 11 is formed with an optically active coating which is applied to an outer surface 20 of the additional or insert element 17. Also, a combined application of suitable optical coatings on the additional or insert element 17 and associated surfaces of the base unit 7 may be provided in order to achieve the desired light decoupling for a monitoring device 3.

The base unit 3 and the additional or insert element 17 are preferably manufactured as castings, for example from a polyetherimide material. Injection moulding in particular enables optical elements 19 to be formed and integrated in an advantageous manner.

The features of the invention disclosed in the above description, the claims and the drawing may be of importance, both individually and in any combination, for realising the invention in its various implementations.

The invention claimed is:

1. An optical coupling unit for an arrangement for sending optical signals, comprising:
    a base unit,
    a light path formed between a light input and a light output of the base unit and configured to transmit light received via the light input to the light output,
    a light path section provided in the light path, which extends outside the base unit and into which the light transmitted along the light path emerges from the base unit via a light exit and from which the light, after passing through the outer light path section, enters again into the base unit via a light entry, and
    a light-decoupling element formed in the light path by means of at least one beam-splitting surface coating and configured to decouple part of the light transmitted along the light path, wherein the outer light path section extends at least partially through an additional unit made from a light-transparent material, wherein the additional unit is between an outer surface of the base unit and the light output.

2. The coupling unit according to claim 1, wherein the light-transparent material of the additional unit is a material which essentially has the same optical refractive index as a light-transparent base unit material.

3. The coupling unit according to claim 1, wherein the additional unit, at least in partial areas of its surface, is received on associated surfaces of the base unit so as to be positively locking.

4. The coupling unit at least according to claim 1, wherein, at least in the area of the light exit and/or in the area of the light entry, associated surfaces of the base unit and the additional unit are arranged so as to lie on top of each other.

5. The coupling unit according to claim 1, wherein the at least one beamsplitting surface coating of the light decoupling element is formed on an outer surface portion of the base unit.

6. The coupling unit according to claim 1, wherein another beam-splitting surface coating of the light-decoupling element is formed on an outer surface portion of the additional unit.

7. The coupling unit according to claim 5, wherein the at least one beam-splitting surface coating and/or the other beam-splitting surface coating is provided in the area of the light exit or of the light entry.

8. An arrangement for sending optical signals, comprising:
an optical coupling unit according to at least one of the preceding claims,
a substrate,
a transmitter arranged on the substrate,
a monitoring device arranged on the substrate, and
an optical fibre connection configured to receive the end of an optical fibre,
wherein the optical coupling unit is configured to transmit light emitted by the transmitter along a light path from a light input of the base unit associated with the transmitter to a light output of the base unit associated with the optical fibre connection while at the same time guiding part of the light decoupled by means of a light-decoupling element via a monitor light output of the base unit associated with the monitoring device to the monitoring device,
wherein the optical coupling unit further comprises an additional unit made from a light-transparent material, wherein the additional unit is between an outer surface of the base unit and the light output.

9. The optical transceiver comprising an arrangement for sending optical signals according to claim 8.

10. The coupling unit according to claim 1 wherein the additional unit is between a mirror surface of the base unit and the light output.

11. The arrangement according to claim 8 wherein the additional unit is between a mirror surface of the base unit and the light output.

12. An optical coupling unit for an arrangement for sending optical signals, comprising:
a base unit,
a light path formed between a light input and a light output of the base unit and configured to transmit light received via the light input to the light output,
a light path section provided in the light path, which extends outside the base unit and into which the light transmitted along the light path emerges from the base unit via a light exit and from which the light, after passing through the outer light path section, enters again into the base unit via a light entry without passing a filler for suppressing reflection or scattering of laser light, and
a light-decoupling element formed in the light path by means of at least one beam-splitting surface coating and configured to decouple part of the light transmitted along the light path,
wherein the outer light path section extends at least partially through an additional unit made from a light-transparent material, wherein the additional unit is between an outer surface of the base unit and the light output.

13. The coupling unit according to claim 12 wherein the additional unit is between a mirror surface of the base unit and the light output.

* * * * *